United States Patent
Chou et al.

(10) Patent No.: US 11,166,225 B2
(45) Date of Patent: Nov. 2, 2021

(54) METHOD FOR SIGNALING RAN PROFILE INDEX AND RADIO COMMUNICATION EQUIPMENT USING THE SAME

(71) Applicant: FG Innovation Company Limited, Tuen Mun (CN)

(72) Inventors: Chie-Ming Chou, Zhubei (TW); Yung-Lan Tseng, Taipei (TW)

(73) Assignee: FG Innovation Company Limited, Tuen Mun, New Territories (HK)

( * ) Notice: Subject to any disclaimer, the term of this patent is extended or adjusted under 35 U.S.C. 154(b) by 0 days.

(21) Appl. No.: 15/666,319

(22) Filed: Aug. 1, 2017

(65) Prior Publication Data

US 2018/0041948 A1 Feb. 8, 2018

Related U.S. Application Data

(60) Provisional application No. 62/369,847, filed on Aug. 2, 2016.

(51) Int. Cl.
*H04W 48/16* (2009.01)
*H04W 72/04* (2009.01)
(Continued)

(52) U.S. Cl.
CPC ........... *H04W 48/16* (2013.01); *H04L 5/0028* (2013.01); *H04L 5/0091* (2013.01); *H04W 48/12* (2013.01);
(Continued)

(58) Field of Classification Search
CPC . H04W 48/16; H04W 72/042; H04W 72/044; H04W 72/048; H04W 48/12;
(Continued)

(56) References Cited

U.S. PATENT DOCUMENTS

| | | | | |
|---|---|---|---|---|
| 2006/0030322 | A1* | 2/2006 | Kim | H04W 36/0055 455/436 |
| 2009/0089865 | A1* | 4/2009 | Baron | G06F 21/6209 726/6 |

(Continued)

FOREIGN PATENT DOCUMENTS

| | | |
|---|---|---|
| CN | 101677255 A | 3/2010 |
| CN | 102224758 A | 10/2011 |

(Continued)

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13); 3GPP TS 36.300 V13.4.0 (Jun. 2016).

(Continued)

*Primary Examiner* — Dinh Nguyen
(74) *Attorney, Agent, or Firm* — ScienBiziP, P.C.

(57) ABSTRACT

A method includes transmitting a RAN profile indexing message from a cell to a user equipment (UE) within the cell's radio coverage, the RAN profile indexing message comprising a plurality of sets of RAN parameters corresponding to a plurality of physical layer configurations, and a plurality of indices corresponding to the plurality of sets of RAN parameters. The method also includes transmitting a downlink control information message to the UE indicating a resource block allocated for the UE, and an index corresponding to one of the plurality of sets of RAN parameters. The method further includes performing a RAN profile indexing operation to define the plurality of sets of RAN parameters corresponding to a plurality of physical layer configurations, and assigning the plurality of indices to the plurality of sets of RAN parameters.

14 Claims, 15 Drawing Sheets

(51) Int. Cl.
  *H04W 48/12* (2009.01)
  *H04L 5/00* (2006.01)
(52) U.S. Cl.
  CPC ....... *H04W 72/042* (2013.01); *H04W 72/044* (2013.01); *H04W 72/048* (2013.01); *H04L 5/0023* (2013.01); *H04L 5/0055* (2013.01)
(58) Field of Classification Search
  CPC ... H04L 5/0028; H04L 5/0091; H04L 5/0023; H04L 5/0055
  See application file for complete search history.

(56) References Cited

U.S. PATENT DOCUMENTS

| | | | |
|---|---|---|---|
| 2010/0115124 A1* | 5/2010 | Cai | H04L 5/0053 709/236 |
| 2010/0191575 A1* | 7/2010 | Raleigh | G06Q 10/06375 455/435.1 |
| 2011/0034198 A1 | 2/2011 | Chen et al. | |
| 2011/0243066 A1* | 10/2011 | Nazar | H04L 5/0055 370/328 |
| 2012/0034927 A1* | 2/2012 | Papasakellariou | H04L 1/1861 455/450 |
| 2012/0163273 A1* | 6/2012 | Na | H04L 5/0094 370/312 |
| 2013/0044727 A1* | 2/2013 | Nory | H04L 5/0092 370/330 |
| 2013/0163606 A1* | 6/2013 | Bagepalli | H04L 49/70 370/409 |
| 2013/0235840 A1* | 9/2013 | Xiao | H04W 72/048 370/329 |
| 2013/0308504 A1* | 11/2013 | Nimbalker | H04L 5/003 370/281 |
| 2014/0056243 A1* | 2/2014 | Pelletier | H04W 72/1268 370/329 |
| 2014/0328228 A1* | 11/2014 | Park | H04B 7/2615 370/280 |
| 2014/0334462 A1* | 11/2014 | Pradas | H04W 72/00 370/336 |
| 2015/0065118 A1* | 3/2015 | Davies | H04W 72/048 455/419 |
| 2015/0110021 A1* | 4/2015 | Lee | H04W 8/26 370/329 |
| 2015/0282246 A1* | 10/2015 | Teyeb | H04W 36/0072 370/312 |
| 2015/0327226 A1 | 11/2015 | Cheng et al. | |
| 2016/0029238 A1* | 1/2016 | Chen | H04W 76/27 370/252 |
| 2016/0080998 A1* | 3/2016 | Fukuta | H04W 48/20 370/331 |
| 2016/0105817 A1* | 4/2016 | Frenne | H04L 5/00 370/252 |
| 2016/0119862 A1 | 4/2016 | Rinne et al. | |
| 2017/0079059 A1* | 3/2017 | Li | H04W 16/02 |
| 2018/0176858 A1* | 6/2018 | Wang | H04W 76/11 |
| 2019/0029000 A1* | 1/2019 | Vikberg | H04W 68/02 |
| 2019/0208481 A1* | 7/2019 | Tang | H04W 56/001 |

FOREIGN PATENT DOCUMENTS

| | | |
|---|---|---|
| CN | 102439869 A | 5/2012 |
| CN | 101677255 A | 2/2013 |
| CN | 103391621 A | 11/2013 |
| CN | 105191203 A | 12/2015 |
| WO | 2015/103630 A1 | 7/2015 |
| WO | 2016/002441 A1 | 1/2016 |
| WO | 2016004900 A | 1/2016 |
| WO | 2016004900 A1 | 1/2016 |
| WO | 2017/195483 A1 | 11/2017 |

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 13); 3GPP TS 36.331 V13.2.0 (Jun. 2016).

Sony, Scenario Proposal for Simultaneous Support of Multiple Parameter Sets, 3GPP TSG RAN adhoc_2016_01_Next_Generation_Access RP-160059, Jan. 29, 2016.

Nokia et al., R3-160735, Key principles for Slice Selection Support in RAN, 3GPP TSG RAN WG3 #91 bis, 3GPP (Apr. 1, 2016).

Zte, R2-162627, Consideration on RAN architecture impacts of network slicing, 3GPP TSG RAN WG2 #93bis, 3GPP (Apr. 1, 2016).

Sony, RPa160059, Scenario Proposal for Simultaneous Support of Multiple Parameter Sets, 3GPP TSG RAN #AHS, 3GPP, (Jan. 26, 2016).

ZTE, R3-161107, Network Slice Selection Procedure, 3GPP TSG RAN WG3 #92, 3GPP, (May 13, 2016).

* cited by examiner

| Index | RAN profile Information Element | | | | | |
|---|---|---|---|---|---|---|
| | Sub-carrier spacing | Multiplexing | Channel coding | TTI | Cyclic prefix | Modulation |
| 0 | Spacing #1 | Multiplex#1 | Coding#2 | TTI#1 | CP#1 | Modulation#1 |
| 1 | Spacing #1 | Multiplex#1 | Coding#1 | TTI#1 | CP#1 | Modulation#1 |
| 2 | Spacing #2 | Multiplex#1 | Coding#2 | TTI#1 | CP#1 | Modulation#2 |
| 3 | Spacing #3 | Multiplex#2 | Coding#3 | TTI#2 | CP#1 | Modulation#3 |
| ⋮ | ⋮ | ⋮ | ⋮ | ⋮ | ⋮ | ⋮ |
| k | Spacing #1 | Multiplex#3 | Coding#1 | TTI#2 | CP#1 | Modulation#4 |

FIG. 7

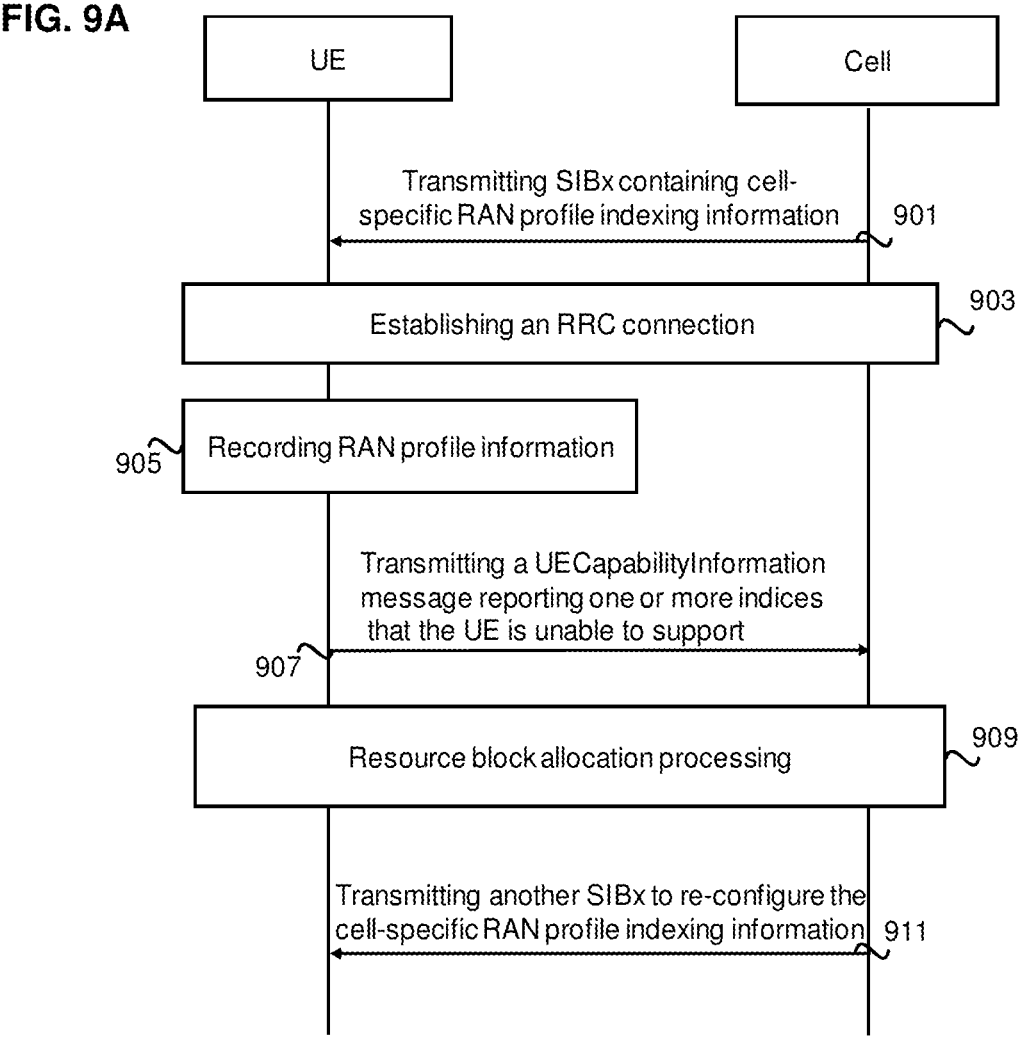

METHOD FOR SIGNALING RAN PROFILE INDEX AND RADIO COMMUNICATION EQUIPMENT USING THE SAME

CROSS-REFERENCE TO RELATED APPLICATION(S)

The present application is related to provisional U.S. Patent Application Ser. No. 62/369,847 filed Aug. 2, 2016, entitled "METHOD FOR SIGNALING RAN SLICING INDEX AND RADIO COMMUNICATION EQUIPMENT USING THE SAME". The disclosure of the application is hereby incorporated fully by reference into the present application.

FIELD

The present application generally relates to wireless communications, and pertains particularly to a method for signaling radio access network (RAN) profile indexing and radio communication equipment using the same.

BACKGROUND

New Radio (NR) has been discussed in the 3rd Generation Partnership Project (3GPP) as a key technology for supporting the operation of the next generation (the fifth generation (5G)) wireless network. NR technology is expected to provide flexible radio protocol structure and architecture to accommodate a wide variety of service scenario requirements, such as high throughput, high reliability, low latency, and lower energy consumption.

RAN slicing (also referred to as RAN profile) is envisioned as one of the key enabling technology for NR. It is desirable for a cell to dynamically configure the RAN profile settings to accommodate the communication capability and service requirements of each user equipment in the cell. However, significant signaling overhead may be required every time the UE communicates (e.g., transmission/reception) with a base station, resulting in a waste of network resources and significant energy consumption.

Thus, there is a need in the art for a method for providing RAN profile information with reduced signaling overhead and latency.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

FIG. 7 is a diagram of an indexing format in the form of an information element, according to an exemplary implementation of the present application.

FIG. 9A is a diagram illustrating a method for RAN profile signaling, according to an exemplary implementation of the present application.

DETAILED DESCRIPTION

Figure 1:
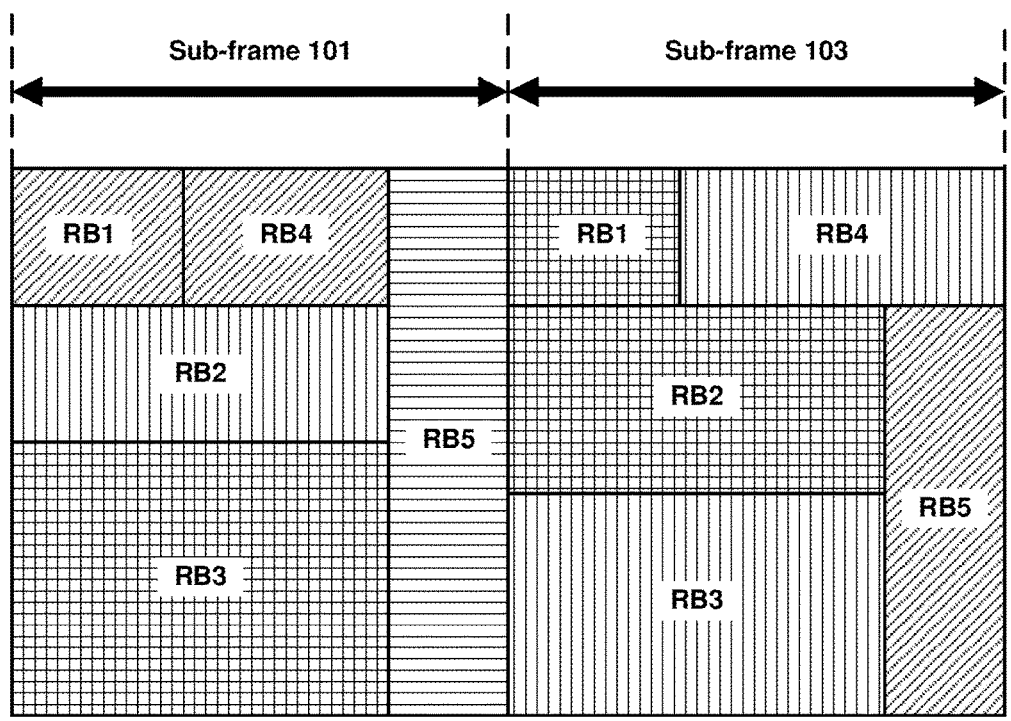
FIG. 1 is a diagram illustrating a RAN profile indexing operation for a radio communication system, according to an exemplary implementation of the present application.

The following description contains specific information pertaining to implementations in the present application. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

The present application provides a method for signaling RAN parameters adopting a RAN profile indexing mechanism to facilitate the transmission and reception operations, where the RAN profile indices correspond to the physical layer configurations between a cell in a radio access network and at least one mobile station (e.g., a UE). By using the indexing mechanism to indicate the RAN profile information, the amount of signaling overhead and latency incurred for RAN profile may be greatly reduced, while supporting the flexibility of NR network system.

A radio communication network architecture (e.g., a long term evolution (LTE) system, a LTE-Advanced (LTE-A) system, or a LTE-Advanced Pro system) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access (E-UTRA) network, a Next-Generation Core (NGC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the LTE, an evolved node B (eNB) as in the LTE-A, a radio network controller (RNC) as in the UMTS, a base station controller (BSC) as in the GSM/GERAN, a new radio evolved node B (NR eNB) as in the NR, a next generation node B (gNB) as in the NR, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage indicated by 3GPP TS 36.300, which is hereby also incorporated by reference. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra reliable communication and low latency communication (URLLC) more efficiently, while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, three candidate coding schemes are considered for NR: (1) low-density parity-check (LDPC), (2) Polar Code, and (3) Turbo Code. The coding scheme adaption may be configured based on the channel conditions and/or the service applications.

Moreover, it is also considered that in a transmission time interval Tx of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR.

According to exemplary implementations of the present application, various RAN profile techniques are adopted to support the above-mentioned flexibilities in NR. FIG. 1 shows a diagram illustrating a RAN profile operation of a cell, according to an exemplary implementation of the present application. As shown in FIG. 1, a cell may assign different resource blocks (RBs) RB1, RB2, RB3, RB4, and RB5 to different UEs in a radio access network. Each RB represents a set of radio resource including, but is not limited to, a group of resource elements spanning a number of subcarriers in the frequency domain and a number of symbols in the time domain. Each RB may be configured to provide different PHY configurations. As shown in FIG. 1, the transmission of sub-frame 101 precedes the transmission of sub-frame 103.

A PHY configuration may comprise a OFDM numerology, a sub-carrier spacing, a transmission type (e.g., DL, guard, SL, or UL), a coding scheme, a modulation scheme, a transmission mode, and the like. Additionally, a specific RAN profile may be configured for a control channel (e.g., physical downlink control channel (PDCCH)) between the cell and each of the UEs within the respective cell coverage areas.

Different resource blocks may have the same or different PHY configurations depending on the scheduling operation. For instance, RB1 may be configured with 15 kHz sub-carrier spacing, 0.25 ms transmission time interval (TTI), LDPC coding for DL transmission, while RB2 may be configured with 60 kHz sub-carrier spacing, 0.75 ms TTI, and Turbo coding for UL transmission. The cell (e.g., eNB in LTE/LTE-A, NR eNB in NR, or NR gNB in NR) may allocate resource blocks RB1 and RB2 to UE1 and UE2, respectively, within sub-frame 101 depending on the capabilities of UE1 and UE2.

The cell may re-configure the PHY configurations in the next transmission frame (e.g., sub-frame 103) depending on the required transmission/reception criteria, such as the channel quality (e.g., CQI) between the cell and the UE, the service requirement of the UE and/or the available network resource. For example, sub-frame 103 may have RB1 having the same block size as RB1 in sub-frame 101, but with a different PHY configuration. The size of each resource block may be variable and may be dynamically configured based on the scheduling operation. For example, the size of RB5 allocated in sub-frame 101 is larger than the size of RB5 in sub-frame 103.

Since a cell can dynamically configure RAN profile settings based on the network operation or applications, the cell may need to constantly communicate with the one or more UEs within its cell coverage and send the physical layer configuration adoption information to the UEs for the UEs to be able to properly encode/decode the corresponding RBs, accordingly.

Accordingly, implementations of the present application provide RAN profile indication signaling mechanisms for a NR communication system capable of reducing the amount of signaling overhead resulting from these dynamical PHY configurations, thereby reducing the radio resource consumption during transmission as well as the latency incurred between end-to-end transmissions.

According to an exemplary implementation of the present application, a new radio communication system includes at least one base station and at least one UE. The base station provides a radio coverage for a specific geographical area forming a radio access network using a plurality of cells. The cells are communicatively linked to a base station, and the base station coordinates the operations of the cells. The cells may have one or more overlapped coverage areas. Each cell operatively allocates and schedules downlink and uplink resources to the respective UE within its cell coverage. Each cell may further allocate sidelink (SL) resources for supporting proximity service (ProSe) communication.

Each cell performs a RAN profile indexing operation and defines a plurality sets of RAN parameters, which corresponds to a plurality of PHY configurations (e.g., PHY configuration 1 through PRY configuration M, where M is an integer). Each cell may dynamically apply one or more PHY configurations based on at least one of the channel conditions, the amount of network resource available, and the capability of the UE present in its cell coverage. According to implementations of the present application, a set of RAN parameters of a PHY configuration may include, but is not limited to a sub-carrier spacing value (e.g., OFDM sub-carrier spacing), a channel coding mode, a multiplexing mode, a modulation mode, a frame type mode, a TTI interval value, a cyclic prefix length value, and a transmission mode, which the UE should follow and process PHY layer signals accordingly upon packet transmission/reception.

During the execution of the RAN profile indexing operation, each cell assigns each RAN profile PHY configuration 1 through PHY configuration N with a corresponding index (e.g., Indices 1 through N, wherein N is an integer). Each index has a specific mapping with a PHY configuration (e.g., L1 configuration in LTE/LTE-A system). The indices 1 through N and the RAN profile PHY configurations 1 through N have one to one correspondences. For example, Index 1 may be configured to correspond to PHY configuration 1; Index 2 may be configured to correspond to PHY configuration 2 and so on.

Thereafter, each cell can simply transmit an index corresponding a particular set of RAN parameters, which in turn corresponds to a particular RAN profile PHY configuration. That is, the index represents the type of RAN profile applied to the corresponding RB assigned to the corresponding UE during subsequent transmission, thereby greatly reducing the signaling overhead and the latency that may incur.

In one implementation, each cell may periodically signal the RAN profile adaption by broadcasting the index or indices to facilitate the transmission and reception operations between the cell and the respective one or more UEs in the cell after executing the RAN profile indexing operation.

In some implementations, each cell may send the RAN profile indexing information to one or more UEs within its cell coverage using unicast transmission, for example, when a UE enters the cell coverage or upon receiving the request for system information (SI) from the UE.

Figure 2:
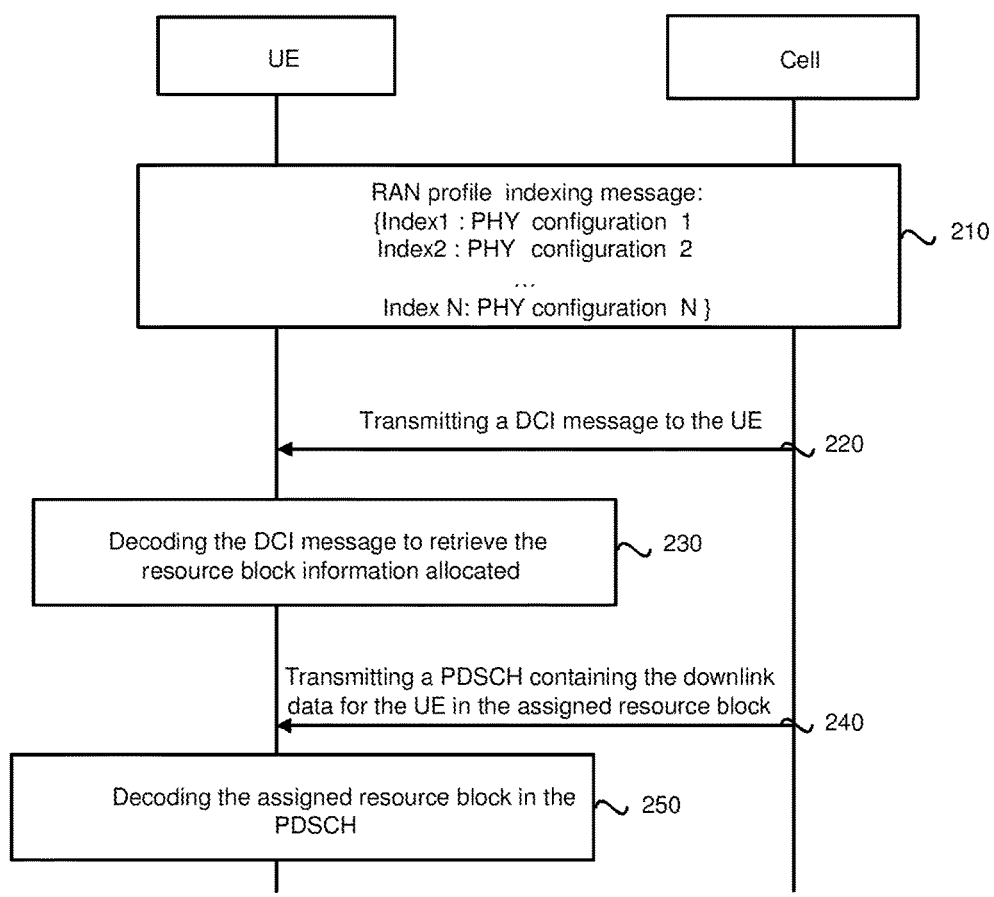
FIG. 2 is a diagram illustrating a method for signaling RAN profile indexing, according to an exemplary implementation of the present application.

FIG. 2 shows a diagram illustrating a method for signaling RAN profile indexing, according to an exemplary implementation of the present application.

In block 210, a cell (e.g., NR eNB/gNB in NR system or eNB in LTE/LTE-A) transmits (e.g., periodically or aperiodically) a RAN profile indexing message to one or more UEs within its cell coverage, for example, using a broadcasting channel (BCH). The RAN profile indexing message at least contains information on RAN profile settings having a plurality of sets of RAN parameters, and a plurality of indices corresponding to the plurality of sets of RAN parameters. Each of the plurality of sets of RAN parameters correspond to a specific PHY configuration. A UE (e.g., UE 1), upon receiving the RAN profile indexing message, stores the RAN profile indexing information received for subsequent communication/reception operations.

In block 220, the cell transmits the RAN profile indexing message to the UE (e.g., UE 1) using a Downlink Control Information (DCI) message in a Physical Downlink Control Channel (PDCCH). The DCI message may comprise resource block allocation information and an index corresponding to one of the plurality of sets of RAN parameters for a specific RAN profile. For example, when the cell decides to allocate a specific resource block (e.g., RB1 of FIG. 1) in a Physical Downlink Shared Channel (PDSCH), in which the PHY configuration 2 is applied for downlink (DL) transmission to the UE (e.g., UE 1), the DCI message may contain information indicating RB1 allocation and Index 2.

In one implementation, the cell may allocate the resource block within the PDSCH through a scheduling operation. Scheduling may involve known resource allocation techniques in the art, the descriptions of which are hereby omitted for brevity.

In block 230, the UE decodes the DCI message received from the cell, and obtains the resource block allocation information (i.e., the allocation of assigned RB (e.g., RB1) in the PDSCH and the corresponding RAN profile index (e.g., Index 2)). Based on the RAN profile index, the UE further retrieves the PHY configuration for the subsequent communication with the cell.

In block 240, the cell transmits a PDSCH containing the downlink data for the UE in the allocated resource block (e.g., RB1) to the UE. In block 250, the UE decodes the allocated/assigned resource block (e.g., RB1) in the PDSCH according to the PHY configuration corresponding to the RAN profile index (e.g., index 2). By using the indexing mechanism for RAN profile, the UE can decode the DL transmission data with the index information received from the serving cell without requiring additional PHY configuration information, thereby reducing signaling overhead and latency.

In one implementation, the cell may execute a RAN profile indexing operation and update RAN profile settings (e.g., modifies RAN parameters) upon receiving the request for system information from one or more UEs within its cell coverage. The cell may then transmit the updates or the changes to the RAN profile settings to the respective UEs within its cell coverage.

In one implementation, the cell may execute the RAN profile indexing operation and update RAN profile settings upon receiving a report from the core network (CN) indicating the backhaul capability and types of service application processing. The cell may then broadcast the updates or the changes to the RAN profile settings to notify the UEs within its cell coverage.

In one implementation, it may be advantageous to allocate at least one resource block (RB) with respective indices to the same UE. In another implementation, it may be advantageous to allocate the same RB with the respective indices to different UEs. In yet another implementation, it may be advantageous to allocate different RBs with the same index to different UEs.

For example, when a cell is communicating with two UEs (e.g., UE 1 and UE 2) within its cell coverage, the cell may allocate the same resource block to both UEs, but assigning different indices indicating different modulation schemes. For example, the cell may require UE 1 to apply non-orthogonal multiplexing upon receiving the assigned RB, and require UE 2 to apply orthogonal multiplexing upon receiving the assigned RB.

In one implementation, the base station may comprise a plurality of radio communication equipments. The plurality of radio communication equipments is configured to support the operation the plurality of cells. More specifically, the radio communication equipments may each be configured to allocate uplink, downlink, and/or sidelink resources to one or more UEs within its cell coverage. The radio communication equipments may each include a built-in memory configured to store the indexing, the RAN profile information and the relation to the physical layer configurations of the corresponding cell.

It is worthy to note that the RAN profile indexing operation may be either cell-based (cell-specific RAN profile) or user-based (user-specific RAN profile) depending on the service requirement and capability of the UE and/or the network resource and system capability of the cell. In other words, RAN profile may be performed based on the overall cell dynamics or performed to accommodate the communication capability of the UE. Various implementations on signaling RAN profile indexing in a radio communication system are next described.

Cell-Specific RAN Profile Indexing Implementation

In a cell-specific RAN profile scenario, the RAN profile indexing and physical layer configuration mapping may be common for all serving UEs within the radio coverage of a specific cell. However, different cells may have their own indexing mechanisms and physical layer configuration mappings within their cell coverages.

Figure 3:
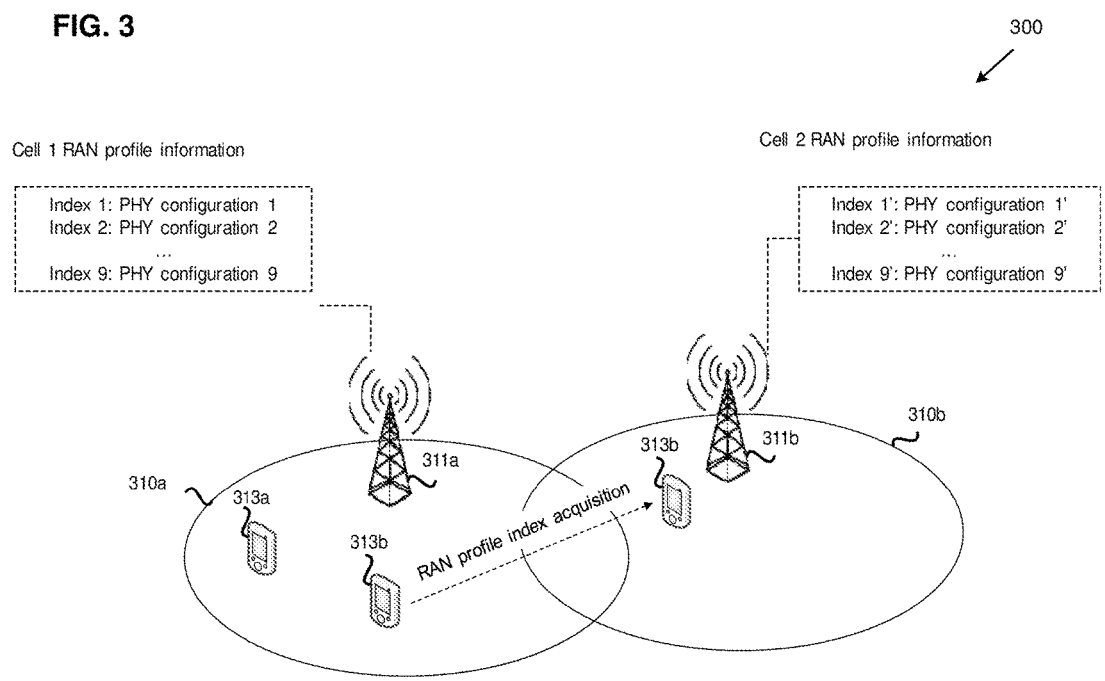
FIG. 3 is a diagram illustrating a cell-specific RAN profile indexing operation, according to an exemplary implementation of the present application.

FIG. 3 illustrates a cell-specific RAN profile operation, according to an exemplary implementation of the present application. Exemplary radio communication system 300 includes a radio access network (RAN) and a core network (CN). The RAN comprises cell 310a and cell 310b. Each cell (e.g., cell 310a/310b) covers a geographical area. The radio coverage of cells 310a and 310b may have an overlapped geographical area as depicted in FIG. 3. Cells 310a and 310b are communicatively linked to a base station (e.g., a physical base station, not explicitly shown in FIG. 3). The operations of cells 310a and 310b are coordinated by the base station. Radio communication system 300 further includes UEs 313a and 313b presently located within the radio coverage of cell 310a. UE 313b is moving toward cell 310b, such that a handover procedure may be implemented to UE 313b. During the handover procedure, cell 310a is the source cell and cell 310b is the target cell. Cell 310a may adopt the indices 1 through 9 for indicating PHY configurations 1 through 9, respectively. Cell 310b may adopt indices 1' through 9' for indicating PHY configurations 1' through 9', respectively.

Radio communication equipment 311a may be deployed in cell 310a to provide the radio converge to the corresponding cell area. Radio communication equipment 311a communicates with the base station, and provides services to UEs 313a and 313b. Radio communication equipment 311b may be deployed in cell 310b to provide the radio converge to the corresponding cell area. Radio communication equipment 311b communicates with the base station, and provides services to the UEs within its cell coverage.

Figure 4A:
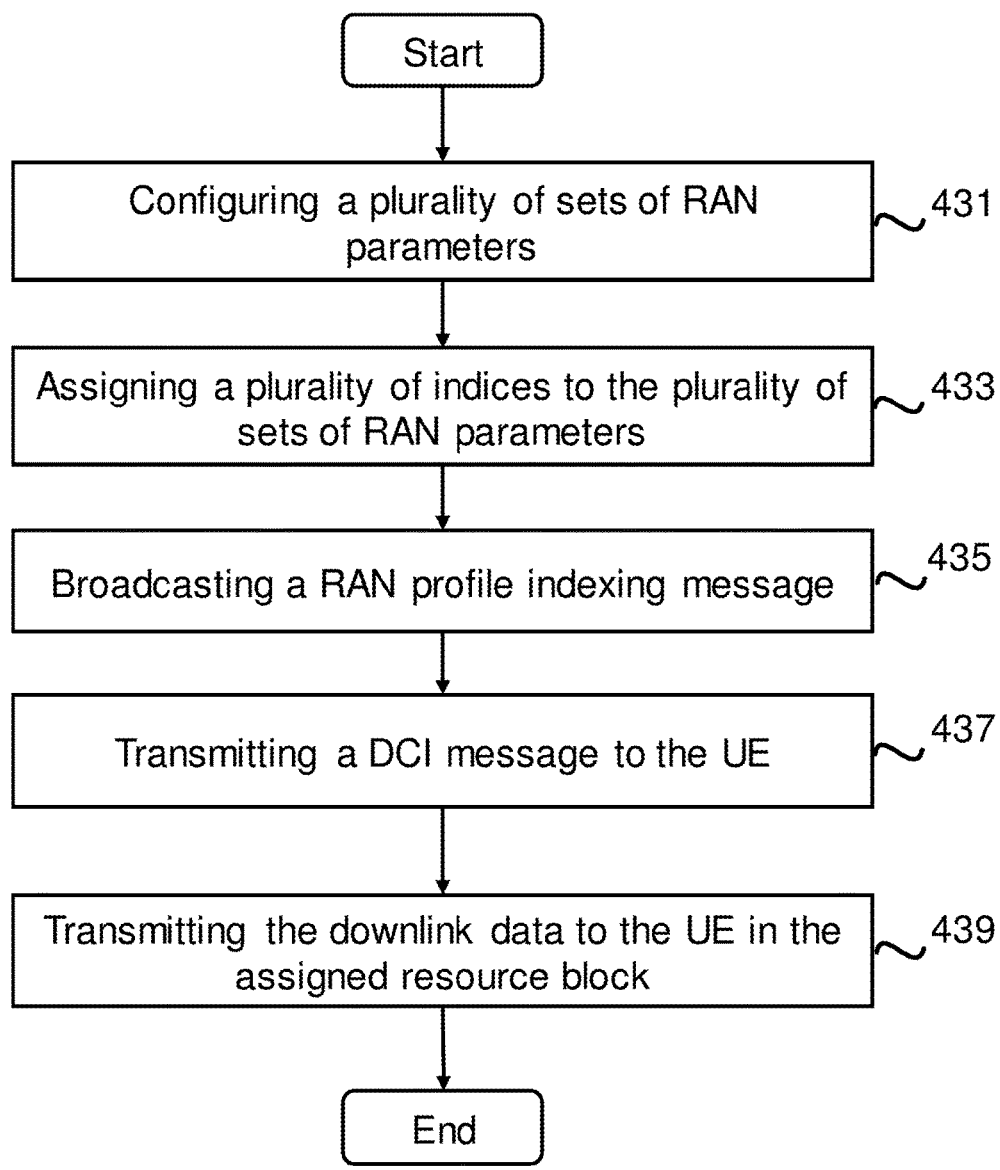
FIG. 4A is a flowchart illustrating a method for signaling RAN profile indexing under a cell-specific RAN profile architecture, according to an exemplary implementation of the present application.

FIG. 4A is a flowchart illustrating a method for signaling RAN profile indexing provided in accordance to FIG. 3. The method is applicable to both cells 310a and 310h in FIG. 3. For brevity, only cell 310a is used as an example for a detailed elaboration of the cell-specific RAN profile operation below.

In block 431, cell 310a configures a plurality of sets of RAN parameters, each of which maps to a corresponding one of a plurality of physical layer configurations (e.g., PHY configurations). In block 433, cell 310a assigns an index to each set of the RAN parameters. For example, cell 310a may assign indices 1 through 9 to PHY configurations 1 through 9, respectively. In block 435, cell 310a broadcasts a RAN profile indexing message to all UEs within its cell coverage, where the RAN profile indexing message contains information on the RAN profile settings (e.g., the plurality of sets of RAN parameters) and the corresponding indices. Cell 310a may broadcast the RAN profile indexing message to all UEs within its cell coverage at predetermined (periodic or aperiodic) time intervals. In block 437, cell 310a transmits a DCI message to a UE within its cell coverage to allocate resources to the UE, where DCI message may indicate a resource block (RB) allocated for the UE, and an index corresponding to one of the plurality of sets of RAN parameters. In block 439, cell 310a transmits downlink data to the UE in the allocated/assigned resource block in a PDSCH.

In one implementation, the CN in radio communication system 300 may recommend the indexing and the PHY configuration to cells 310a and 310b based on the operating criteria of the CN, such as backhaul capability. Different cells may require different PHY configurations to fulfill the end-to-end latency requirements. In one implementation, the CN may include one or more network elements for configuring RAN profile operation based on backhaul capability between the cells in radio communication system 300. In another implementation, the CN may inform the cells based on the backhaul capability, and the cells may configure the RAN profile indexing taking the backhaul capability into consideration.

In one implementation, cells 310a and 310b may adopt the same indexing mechanism. For example, the PHY configurations 1 through 9 of the indices 1 through 9 for cell 310a may be the same as that of indices 1' through 9' of the cell 310b. More specifically, a default and common index table may be used in radio communication system 300 for describing the associating physical layer configurations, where the default and common index table may be provided by the CN and recorded in the UE capability profile. In such scenarios, cells 310a and 310b are not required to provide physical layer configuration mappings. Rather, cells 310a and 310b may provide indices that are supported within their coverages through broadcasting or unicasting transmission.

In one implementation, cells 310a and 310b may adopt different indexing mechanisms. For example, the indices 1 through 9 corresponding to the PHY configurations 1 through 9 adopted by cell 310a may be different from the indices 1' through 9' corresponding to the PHY configurations 1' through 9' adopted by cell 310b. Each cell (e.g., cell 310a/310b) may signal its indexing and physical layer configurations mapping information within its coverage to the serving UEs through broadcast or unicast transmission.

In one implementation, the cell may transmit the RAN profile indexing information to the UE based on a request for system information received from the UE. Specifically, when a UE (e.g., UE 313b) moves from one cell coverage (e.g., the radio coverage of cell 310a) to a neighboring cell coverage (e.g., the radio coverage of cell 310b), a RAN profile indexing acquisition procedures may be required. UE 313b may perform a RAN profile indexing acquisition procedure. In one implementation, according a RAN profile indexing acquisition procedure, a serving cell may exchange the adopted RAN profile indexing and physical layer configuration mapping information with a target cell upon receiving a report from a UE indicating that the channel quality of the target cell is better than the serving cell after a predetermined time. The target cell may feedback a RAN profile indexing difference (in comparison to the serving cell) to the serving cell, and thereafter, the serving cell may signal the difference in a unicast message to the UE. The source cell may deliver (1) the physical layer configurations which the UE could support to the target cell; and (2) the source cell's RAN profile indexing and physical layer configuration mapping information, which are configured to the UE, to the target cell. So, the target cell can create the RAN profile indexing difference based on the given information.

Figure 4B:
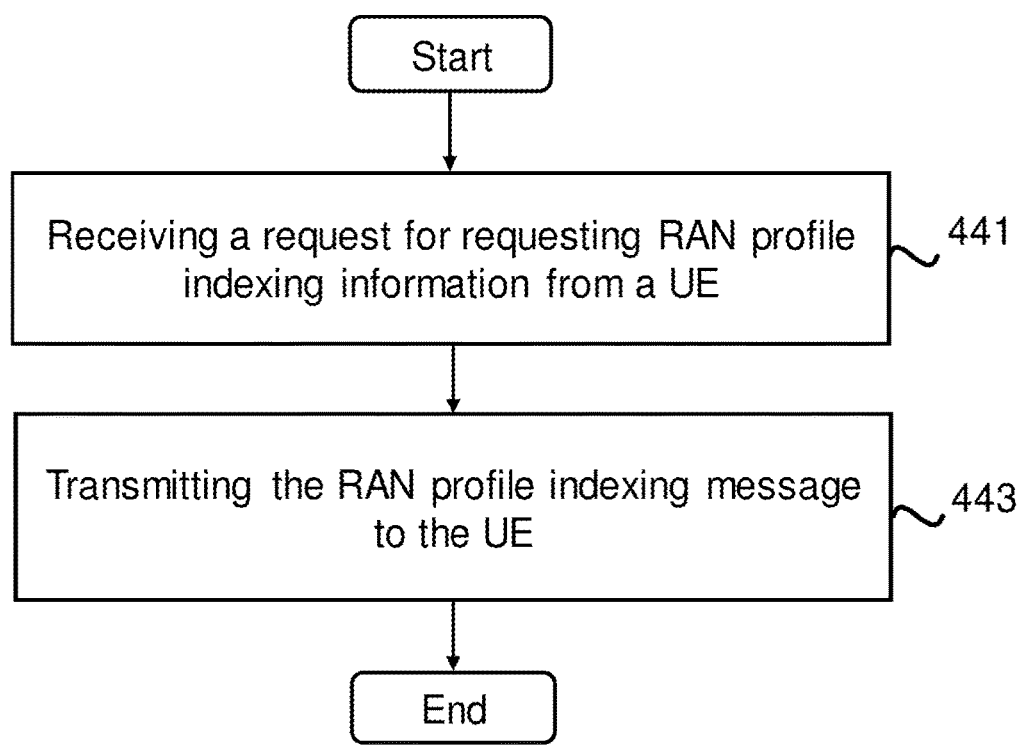
FIG. 4B is a flowchart illustrating a method for signaling RAN profile indexing, according to an exemplary implementation of the present application.

More specifically, FIG. 4B shows a flowchart illustrating a method for signaling RAN profile information based on a request for system information from a UE provided in accordance with FIG. 4A of the present application.

In block 441, a cell (e.g., cell 310b) receives a request (e.g., a request for system information) from a UE (e.g., UE 313b) within its cell coverage, where the UE requests for the transmission of the RAN profile indexing information and the physical layer configuration mapping information, for example, using a physical uplink control channel (PUCCH). In block 443, the cell (e.g., cell 310b) may transmit the RAN profile indexing message containing the RAN profile indexing and the physical layer configuration mapping information to the UE, for example, in a unicast manner.

As mentioned above, each of cells 310a and 310b may reconfigure and change its RAN profile indexing based on the channel quality between the cell and the corresponding UEs, the network system capability, or the recommendation from the CN. The cell may communicate with one or more UEs in its cell coverage using a radio resource control (RRC) message (e.g., an RRCConnectionReconfiguration message) in a downlink shared channel to indicate the RAN profile changes thereafter.

In one implementation, the cell may reconfigure its RAN indexing and physical layer configuration mapping information either semi-statically or dynamically. For example, the RAN profile may be updated or changed at a specific period of time. The radio communication equipment at the cell and/or the UE may be equipped with a timing element, which is configured to count to a predetermined time after the cell transmits the RAN profile indexing information to one or more UEs within its cell coverage. Before the timing element counting to the predetermined time, the cell may not make any updates to its current RAN profile indexing and PHY configurations. In other words, after the cell had just transmitted the RAN profile indexing information, the UE does not have to keep tracking the indexing and physical layer configuration mapping information until after the predetermined time expires.

Figure 4C:
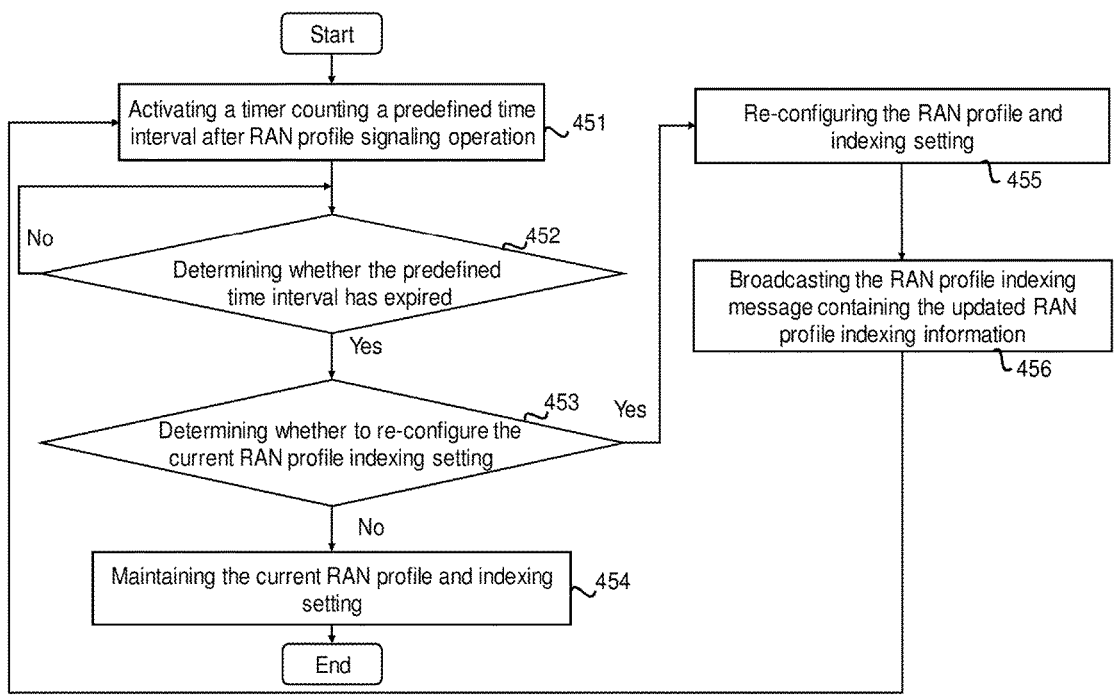
FIG. 4C is a flowchart illustrating a method for signaling RAN profile indexing after a predefined time interval, according to an exemplary implementation of the present application.

FIG. 4C shows a flowchart illustrating a method for signaling RAN profile indexing after a time interval provided, according to an exemplary implementation of the present application.

In block 451, after a cell (e.g., cell 310a) broadcasts a current RAN profile indexing message within its cell coverage, for example, using a BCH, the cell operatively initiates a timer counting a predetermined/predefined time interval (e.g., a modification period). In one implementation, the predetermined/predefined time interval may be configured to be 80 ms as indicated in 3GPP TS 36.331, which is hereby incorporated by reference. The predetermined/predefined time interval may be configured by a system information (SI) message.

In block 452, the cell (e.g., cell 310a) determines whether the predetermined/predefined time interval has expired according to the counting result of the timer. When the predetermined/predefined time interval has expired, the cell executes block 453. When the predetermined/predefined time interval has not expired, the cell maintains the current RAN profile settings and re-execute block 452.

In block 453, the cell (e.g., cell 310a) determines whether to re-configure the current RAN profile indexing settings. The cell can determine whether reconfiguration is needed based on the information related to the network dynamics, such as channel condition, feedback from the CN, and/or the capability report from the UE. When the cell determines to re-configure the current RAN profile indexing settings, the cell executes block 455. Otherwise, the cell executes block 454 and maintains the current RAN profile settings.

In block 455, after determined to re-configure the current RAN profile indexing settings, the cell (e.g., cell 310a) may execute the RAN profile indexing operation, and reconfigure the RAN profile, flapping to the physical layer, and the associated indexing settings. The cell may update the RAN profile settings based on the information related to network dynamics provided by the CN and/or cell loading.

In block 456, after the reconfiguration, the cell (e.g., cell 310a) may broadcast the updated RAN profile indexing message containing the updated RAN profile indexing information within its cell coverage using a BCH.

In one implementation, after the cell (e.g., cell 310a) broadcasts the updates or the changes to the RAN profile settings to notify the UEs within its cell using the BCH, the cell may (re)initiate the timer and transmit a predetermined/predefined time interval value to the UE using a BCH. The predetermined/predefined time interval value may be the same or different from the previously predetermined/predefined time interval value.

The RAN profile indexing and physical layer configuration mapping may be also transmitted to the UE through a dedicated RRC message, a periodic system information (SI), or on-demand SI. For example, after the cell (e.g., the cell 310a) transmits the updated RAN profile settings using BCH to notify a respective UE within its cell. The cell may initiate the timer and transmit a dedicated RRC message containing the predefined time interval value to the specific UE by unicast using the communication link provided by the respective cell.

In another implementation, when the UE sends the request for reconfiguring the RAN profile information to the cell communicated therewith after the cell had just broadcasted the current RAN profile indexing message, the cell may not re-configure the current RAN profile settings until after the expiration of the predetermined/predefined time interval.

Under a RAN sharing scenario (e.g., collocated cells for different public land mobile networks (PLMNs)), the cells may have corresponding indexing and physical layer configuration mapping for each PLMN. Different PLMN networks may adopt different RAN profile settings based on the applications/services provided.

User-Specific RAN Profile Indexing Implementation

Different from the cell-specific RAN profile implementation, under a user-specific RAN profile implementation, each UE may have its own dedicated RAN profile indexing and physical layer configuration mapping information within a cell coverage. The UEs within one cell coverage may have the same or have different RAN profile indexing settings.

Figure 5:
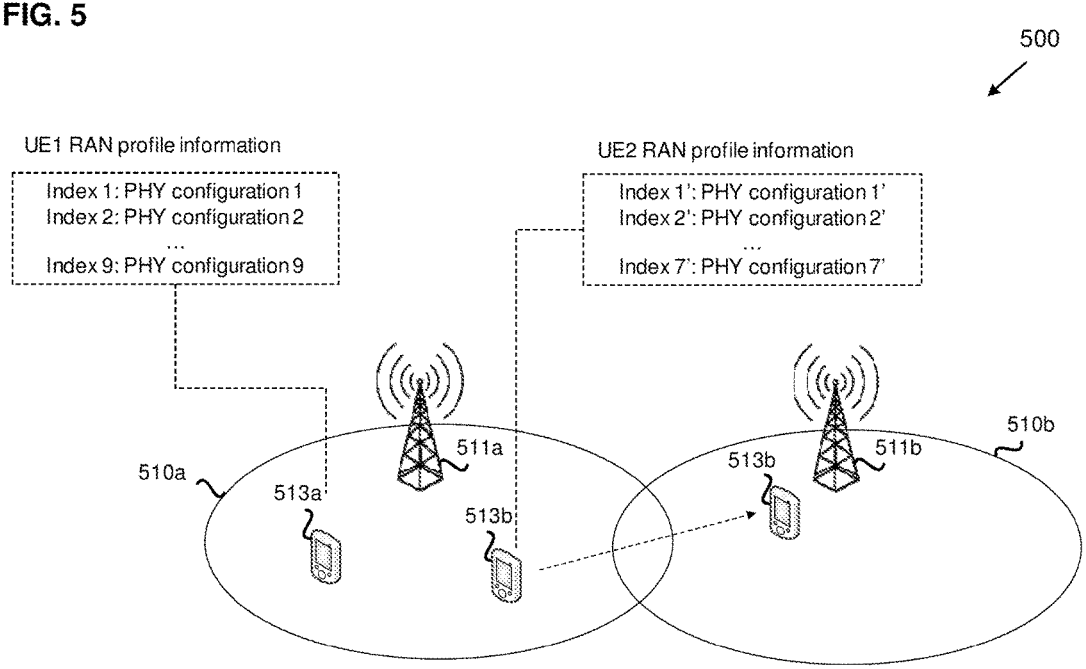
FIG. 5 is a diagram illustrating a user-specific RAN profile indexing operation, according to an exemplary implementation of the present application.

FIG. 5 illustrates a user-specific RAN profile indexing operation, according to an exemplary implementation of the present disclosure. Exemplary radio communication system 500 includes a radio access network (RAN) and a core network (CN). The RAN includes cell 510a and cell 510b. Each cell (e.g., cell 510a or cell 510b) covers a geographical area. the radio coverage of cells 510a and cell 510b may have an overlapped geographical area as depicted in FIG. 5. The cells are communicatively linked to a base station (e.g., a physical base station, not explicitly shown in FIG. 5). The operations of cells 510a and 510b are coordinated by the base station. UEs 513a and 513b are presently located within the radio coverage of cell 510a, and served by cell 510a. UE 513b is moving toward the cell 510b, such that a handover procedure may be implemented to UE 513b. During the handover procedure, cell 510a is the source cell and cell 510b is the target cell.

In FIG. 5, radio communication equipment 511a may be deployed in cell 510a to provide the radio converge to the corresponding cell area. Radio communication equipment 511a communicates with the base station, and provides services to the UEs 513a and 513b. Radio communication equipment 511b may be also deployed in cell 510b to provide the radio converge to the corresponding cell area. Radio communication equipment 511b communicates with the base station, and provides services to the UEs within its cell coverage.

UE 513a and UE 513b in the present implementation may support different physical layer configurations due to their different capabilities, therefore have different RAN profiles and physical layer configurations. UE 513a and UE 513b may have different sets of indices and physical layer configuration mapping. Specifically, UE 513a may adopt indices 1 through 9 corresponding to PHY configurations 1 through 9, respectively. UE 513b may adopt indices r through 7' corresponding to PHY configurations 1' through 7', respectively.

Cells 510a and 510b may execute RAN profile indexing operation based on their individual communication capabilities, types of subscription, service requirements, and QoS requirements of UEs 513a and 513b.

In one implementation, the CN in radio communication system 500 may recommend the indexing and the PHY configuration setting related to UE indexing to cells 510a and 510b based on its network operation criteria, such as fronthaul and backhaul capabilities. Different cells may require different PHY configurations to fulfill end-to-end latency requirements. In one implementation, the CN may include one or more network elements for configuring RAN profile settings based on the network operating criteria, such as the fronthaul capability between the UEs and the cells and/or the backhaul capability between the cells in radio communication system 500.

Figure 6A:
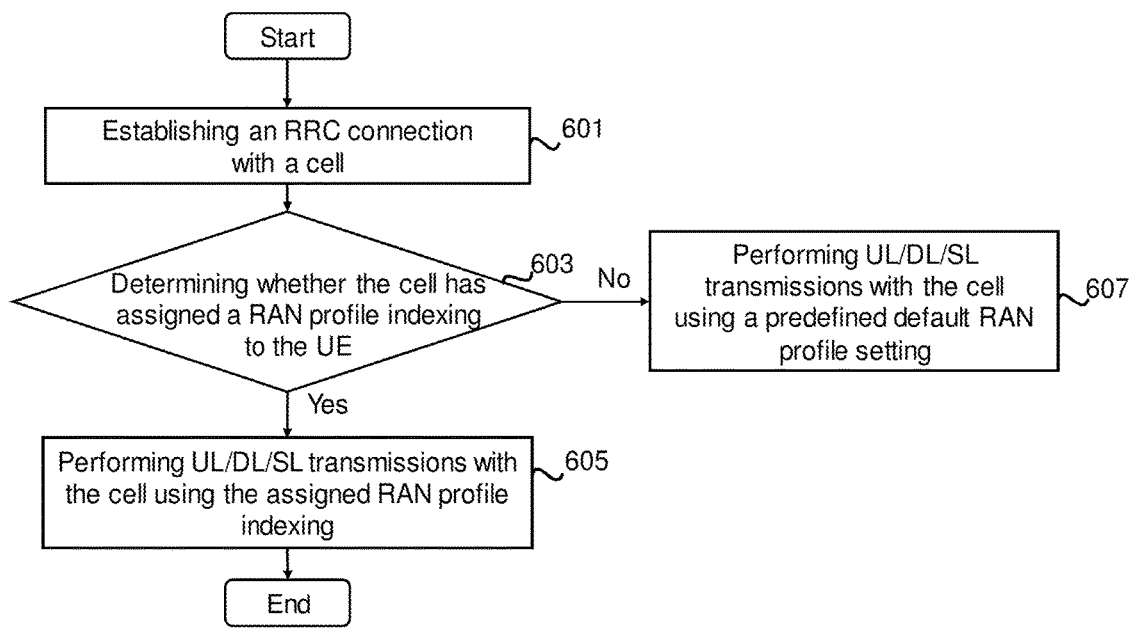
FIG. 6A is a flowchart illustrating a method for a UE to communicate with a cell, according to an exemplary implementation of the present application.

When a cell does not assign a RAN profile indexing to a UE, (e.g., did not signal the UE with an assigned RAN profile indexing during an RRC connection establishment phase), the UE may use a default PHY configuration for resource block processing during the transmission/reception operations as depicted in FIG. 6A.

FIG. 6A shows a flowchart illustrating a method for a UE to communicate with a cell, according to an exemplary implementation of the present disclosure.

In block 601, when a UE (e.g., UE 513b) moves from one cell coverage (e.g., the radio coverage of cell 510a) to a neighboring cell coverage (e.g., the radio coverage of cell 510b), the UE establishes an RRC connection with the neighboring cell.

In block 603, the UE (e.g., UE 513b) determines whether the neighboring cell, now the serving cell, has assigned any RAN profile indexing to the UE.

When the UE (e.g., UE 513b) determines that the serving cell (e.g., cell 510b) did not assign any RAN profile indexing to the UE, during the RRC connection establishment, the UE may execute block 607 to perform UL/DL/SL transmissions with the serving cell using a predefined default RAN profile setting. The default PHY configuration may be pre-configured and stored in a memory of the UE.

When the UE (e.g., UE 513b) determines that the serving cell (e.g., cell 510b) assigned the RAN profile indexing to the UE, the UE executes block 605 to perform UL/DL/SL transmissions with the serving cell (e.g., cell 510b) using an assigned RAN profile setting.

Figure 6B:
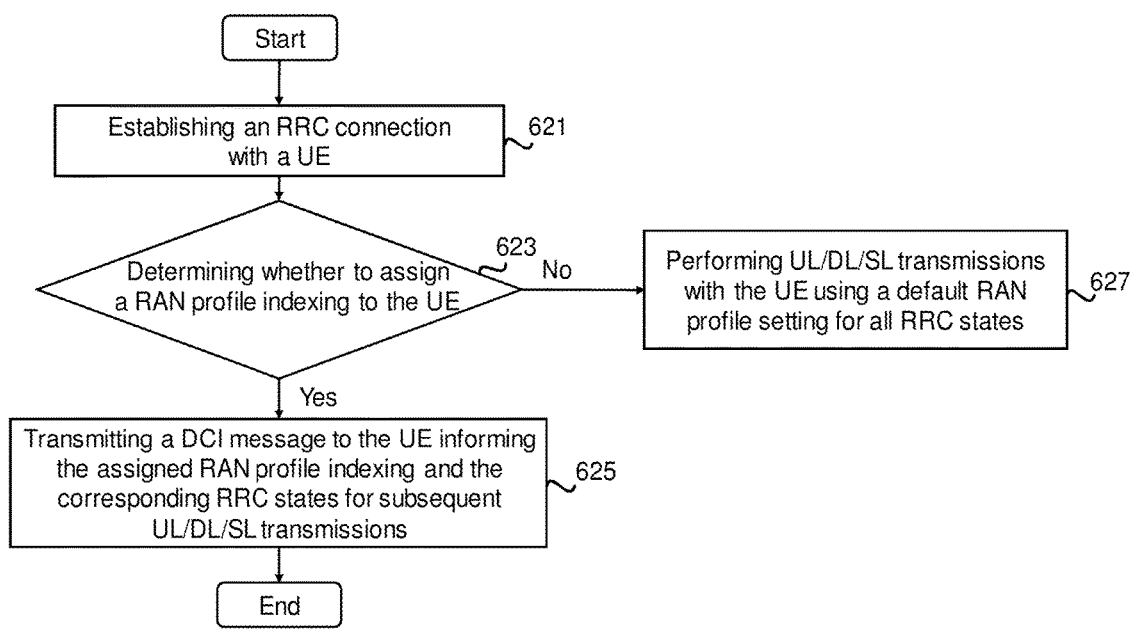
FIG. 6B is a flowchart illustrating a method for signaling RAN profile indexing under a user-specific RAN profile architecture, according to an exemplary implementation of the present application.

When the cell (e.g., cell 510b) does assign a RAN profile indexing to the UE, the cell may further indicate which respective RRC states (e.g. a connected state, an inactive state, or an idle state), that each index of the RAN profile indexing could be applied for, as depicted by FIG. 6B. In some other implementations, the cell may assign one RAN profile indexing with one specific RRC state. So, the cell may configure more than one RAN profile indexing to the UE, where each RAN profile indexing is configured for a specific RRC state.

FIG. 6B is a flowchart illustrating a method for signaling RAN profile indexing under a user-specific RAN profile architecture, according to an exemplary implementation of the present application. When the cell does not indicate the RAN profile indexing during different states, the UE may treat the RAN profile indexing as being common for all RRC states or only limited for the current RRC state of the UE.

In block 621, when a UE (e.g., UE 513b) moves from a cell coverage (e.g., the radio coverage of cell 510a) to a neighboring cell coverage (e.g., the radio coverage of cell 510b), the neighboring cell receives a handover preparation request from the serving cell, and establishes an RRC connection with the UE (e.g., UE 513b). In block 623, the neighboring cell (now the serving cell) (e.g., the cell 510b) determines whether to assign a RAN profile indexing to the UE (e.g., the UE 513b).

When the serving cell (e.g., cell 510b) decides to assign a RAN profile indexing to the UE (e.g., UE 513b) during an RRC connection establishment, the serving cell executes block 625 to transmit a DCI message to the UE informing the assigned RAN profile indices and the corresponding RRC states for subsequent UL/DL/SL transmissions, for example, through unicast.

When the serving cell (e.g., cell 510b) decides not to assign a RAN profile indexing to the UE (e.g., UE 513b) during the RRC connection establishment, the cell executes block 627 to perform subsequent UL/DL/SL transmissions with the UE using a default RAN profile setting for all RRC states.

In one implementation, a cell (e.g., cell 510a or 510b) may exchange the RAN profile indexing associated with its serving UEs with a neighboring cell (e.g. during handover preparation stage) through an X2 interface. When a UE (e.g., UE 513b) moves from a cell coverage (e.g., the radio coverage of cell 510a) to a target cell coverage (e.g., the radio coverage of cell 510b), the RAN profile indexing acquisition procedures may not be required when the target cell supports the original RAN profile indexing (e.g., the RAN profile indexing and mapping at cell 510a). Moreover, when no RAN profile indexing is received by the UE (e.g., UE 513b) during the handover preparation stage, the UE may automatically assume to use the original RAN profile indexing for transmission/reception with the target cell (e.g., cell 510b) and other UE(s) in the sidelink.

Additionally, under the user-specific RAN profile, the RAN profile indexing may be re-configured either semi-statically or dynamically within the same cell coverage (e.g., the radio coverage of cell 510a or 510b). In one implementation, the cell (e.g., cell 510a or 510b) may re-configure the RAN profile indexing for a specific UE based on the running applications and operating conditions of the serving cell. In another implementation, the RAN profile indexing may be re-assigned, when the UE (e.g., UE 513a or 513b) is roaming in another PLMN. In yet another implementation, the RAN profile indexing may be re-assigned, when the UE (e.g., the UE 513a or 513b) makes a state transition when the UE is moving from one cell to another (e.g., during a handover process).

In one implementation, the cell (e.g., cell 510a or 510b) may transmit the RAN profile indexing information by an RRC message or a media access control (MAC) control element (CE).

Figure 6C:
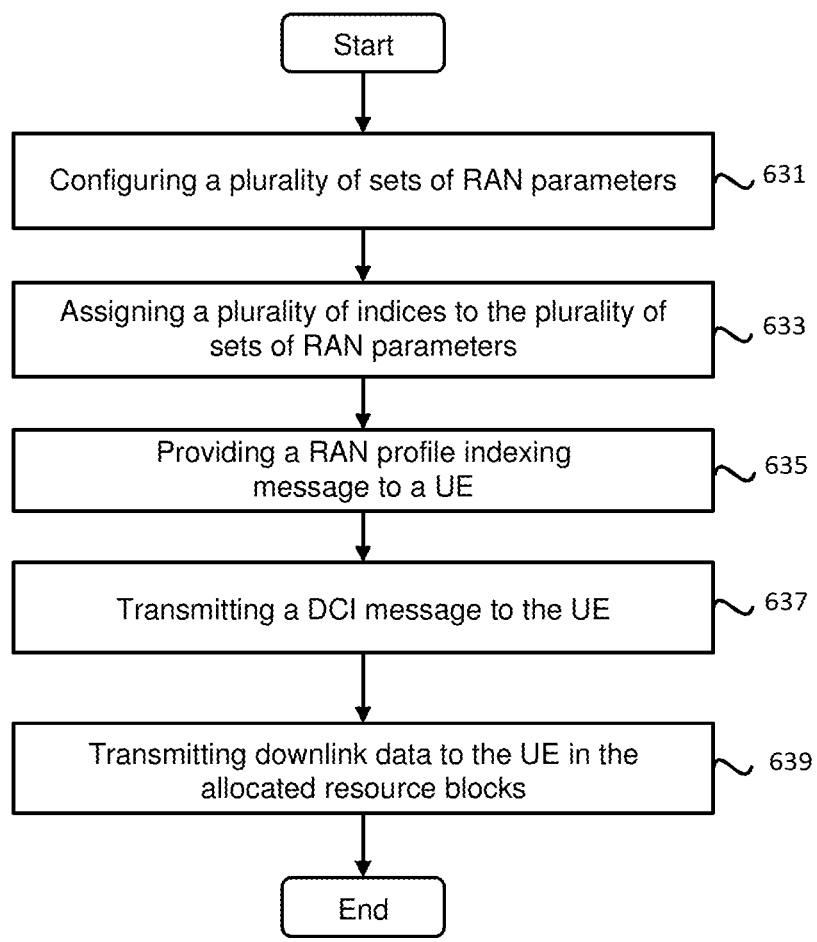
FIG. 6C is a flowchart illustrating a method for signaling RAN profile indexing under a user-specific RAN profile architecture, according to an exemplary implementation of the present application.

FIG. 6C is a flowchart illustrating a method for signaling RAN profile indexing under a user-specific RAN profile architecture, according to an exemplary implementation of the present application. In block 631, cell 510a configures a plurality of RAN profile settings (e.g., a plurality of sets of RAN parameters), each of which maps to a corresponding one of a plurality of physical layer configurations (e.g., PHY configurations), to at least one UE (e.g., UE 513a and UE 513b) within its cell coverage. In block 633, cell 510a assigns a corresponding index to each of the plurality of RAN profile settings of UE 513a and UE 513b. For example, cell 510a may assign indices 1 through 9 to PHY configurations 1 through 9 of UE 513a. Cell 510a may also assign indices 1' through 7' to PHY configurations 1' through 7' of UE 513b.

In block 635, cell 510a provides a RAN profile indexing message to each of UE 513a and UE 513b, where each of the RAN profile indexing messages contains information on the RAN profile settings (e.g., a plurality of sets of RAN parameters) and the corresponding indices. Cell 510a may provide the corresponding RAN profile indexing message to each of UE 513a and UE 513b at predetermined (periodic or aperiodic) time intervals. In one implementation, cell 510a may provide different predetermined time intervals to UE 513a and UE 513b.

In block 637, cell 510a transmits a DCI message to each of UE 513a and UE 513b to allocate resources to each UE. In block 639, cell 510a transmits downlink data to each of UE 513a and UE 513b in the corresponding allocated/assigned resource blocks in a PDSCH. In the present implementation, the messages (e.g., the RAN profile indexing messages in block 635, and the DCI messages in block 637) are provided to UE 513a and UE 513b, for example, through unicast.

The present application further provides three aspects that are considered for indexing signaling procedure. The three aspects are: (I) Indexing Format for Index Signaling; (II) Acknowledgement of the RAN profile indexing and Physical layer configuration mapping from a specific UE; (III) Notification for changes to RAN profile indexing.

I. Indexing Format for Indexing Signaling

In one implementation, the RAN profile indexing information may take the form of an information element (IE). FIG. 7 shows an exemplary index format in the form of an information element, according to an exemplary implementation of the present application.

As shown in FIG. 7, a RAN profile indexing format in the form of an information element (IE) comprises indices 0 through k, where k is an integer, and each index is associated with a corresponding RAN parameter IE, which comprising a set of RAN parameters. Each RAN parameter IE may include a set of physical layer configuration fields. The physical layer configuration may include, but is not limited to, a sub-carrier spacing, a multiplexing scheme, a channel coding scheme, a transmission time interval (TTI), a cyclic prefix and a modulation scheme, where the field addresses may be associated with the adopted physical layer parameters linked to the index assigned. In one implementation, the IE may further include the RRC states that each RAN profile index (or each RAN profile indexing) is associated with. Each index may be associated with a set of fields within the IE.

For example, Index 0 may correspond to a sub-carrier spacing #1, a multiplexing #1, a channel coding scheme #2, a TTI #1, a CP #1, and a modulation scheme #1. Index 1 may correspond to a sub-carrier spacing #1, a multiplexing #1, a channel coding scheme #1, a TTI #1, a CP #1, and a modulation scheme #1. Index k may correspond to a sub-carrier spacing #1, a multiplexing #3, a channel coding scheme #1, a TTI #2, a CP #1, and a modulation scheme #4.

It may be advantageous to have the IE cover more transmission related parameters. Thus, the IE shall not be limited by the listed fields/elements shown in FIG. 7. Moreover, a cell may optionally append the fields in the IE based on its determination from the channel condition, the network system capability, and the UE's capability. For the fields that do not appear in the IE, the UE is to apply a set of default parameters.

Among other advantages, using information element to conveying RAN profile indexing for signaling procedure allows a cell to flexibly construct PHY configurations and to map the PHY configurations to the respective information elements based on the criteria, such as channel condition, service requirement, quality of service (QoS) requirements and the like.

Figure 8:
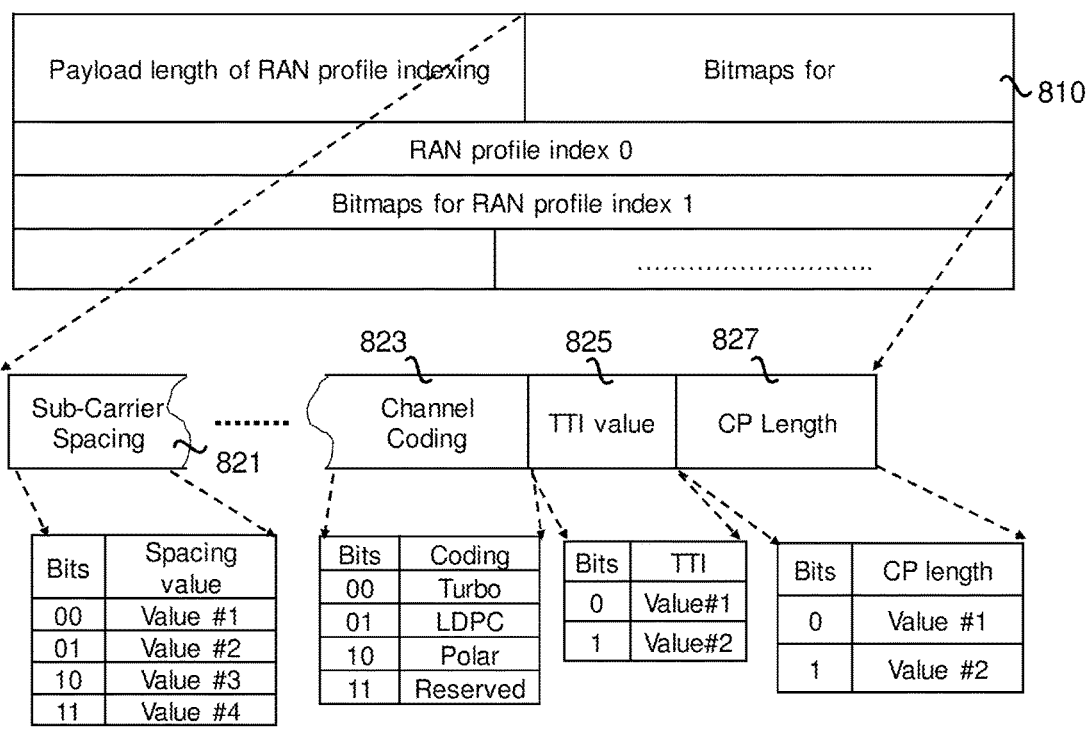
FIG. 8 is a diagram of a bitmap indexing format, according to an exemplary implementation of the present application.

FIG. 8 illustrates a diagram of a bitmap indexing format, according to an exemplary implementation of the present disclosure. In FIG. 8, a predetermined bitmap 810 may be used by a cell for signaling RAN profile indexing. Bitmap 810 has a fixed length and limited number of components. The components include, but are not limited to, sub-carrier spacing 821, channel coding 823, TTI value 825, and CP length 827. Bits can be allocated to represent the physical layer configuration settings, such as a sub-carrier spacing value, a channel coding mode, a TTI value, a CP length value, a multiplexing mode, and/or a frame type mode. The cell may configure the specific PHY configuration setting by manipulating specific bits. The UE can later translate the specific bitmaps to the dedicated PHY configurations.

A cell may include a network element specifying the payload lengths of all indexing formats, and append the bitmap for each associated index. The bitmap format of RAN profile indexing is valid for all cells and UEs within the radio communication system and UEs regardless of cell-specific or user-specific RAN profile indexing.

II. Acknowledgement of RAN Profile Indexing for a Specific UE

In practice, a UE may or may not support all of the physical layer configuration settings (e.g., PHY configurations) defined by the serving cell. Thus, it is necessary for the UE to transmit an acknowledge message or a confirmation message to the cell, after receiving the RAN profile indexing information.

In one implementation, when the cell signals the RAN profile indexing information in a unicast manner to a specific UE within its cell coverage (e.g., a user-specific scenario), the UE may respond with a confirmation message upon receiving the RAN profile indexing information. More specifically, when the UE is capable of supporting all the indices that the cell has assigned, the confirmation message is an acknowledge message (e.g., ACK message), indicating that all RAN profile indexing currently defined is applicable.

When the UE does not support one or more indices, the confirmation message may contain a list of one or more RAN profile indices that are not supported by the UE, indicating one or more PHY configurations that are not supported by the UE. The UE may further indicate in the confirmation message the reasons why the UE does not support the PHY configurations. The cell operatively performs scheduling and transmission operations based on the type of confirmation message received from the UE after a predetermined period of time, and facilitates the subsequent processing accordingly. The predetermined period of time starts counting after the cell transmits the RAN profile indexing information to the UE by unicast transmission.

Under the user-specific RAN profile indexing scenario, a cell may re-configure the current RAN profile indexing and PHY configurations upon receiving the confirmation message. Specifically, the cell may re-configure or modify the current indexing and PHY configuration settings based on the list of unsupported RAN profile indexing information received from the UE.

In one implementation, the cell may signal the RAN profile indexing information in a broadcast manner (e.g., by a system information message) to one or more UEs within its radio coverage (e.g., a cell-specific scenario). During the establishment of an RRC connection, a UE may acquire the RAN profile indexing information from the serving cell, and report its capability during a UE capability negotiation process.

More specifically, an indexing confirm information element (IE) may be appended in a UECapabilityInformation message to indicate the invalid or unsupported RAN profile indexing. Under the cell-specific scenario, the cell does not re-configure the current RAN profile indexing after receiving the indexing confirm IE. Moreover, if the UE sends a UECapabilityInformation message to the cell indicating the RAN profile indexing that the UE does not support, the cell is configured to record the UE capability information, and avoids using the specific RAN profile indexing for the respective UE during scheduling operation. If a UE does not support all the RAN profile indexing defined by the serving cell, the serving cell is to serve the particular UE with a default slicing setting, (e.g., considering the respective UE as a legacy UE).

In one implementation, when the UE, of which the cell is communicating with, is in an idle state, the UE is not required to send an acknowledge or confirmation signal. Instead, the cell is required to ensure that the RAN profile indexing and the associated physical layer configuration mapping for idle state is supported by all UEs.

III. Notification for the Changes to RAN Profile Indexing

A cell may re-configure the RAN profile indexing. In one implementation, the cell may re-configure the RAN profile indexing upon request from the UE (e.g., a user-specific setting), the core network, and/or the neighboring cell. The RAN profile indexing reconfiguration may include at least one of adding a new RAN profile indexing and the associated physical layer configuration mapping, deleting an existing RAN profile indexing, modifying the physical layer configuration for a specific RAN profile indexing, and canceling all of the existing RAN profile indexing and the associated physical layer configuration mapping.

In one implementation, the cell may transmit an RRC-ConnectionReconfiguration message or a specific system information with an action field specifying the changes to the RAN profile to the serving UEs. The bits specified in the action field in the RRCConnectionReconfiguration message are used to indicate the changes to RAN profile information. Table 1 below illustrates an example of RRC profile indexing change notification.

TABLE 1

RRC Profile Indexing Change Notification.

| Bits | Action |
|------|--------|
| 00 | Add |
| 01 | Delete |
| 10 | Modify |
| 11 | Cancel |

When the action field is set to "00", the cell indicates that a new RAN profile indexing and mapping corresponding to a PHY configuration is added. When the action field is set to "01", the cell indicates that a specified RAN profile indexing is removed from the RAN profile indexing listing. When the action field is set to "10", the cell indicates that a change is made to an existing RAN profile indexing setting. Moreover, if the cell uses the information element for RAN profile indexing signaling, the cell may transmit the RAN profile indexing with delta information representing the modified portion of the physical layer configuration. If the cell uses the bitmap form for RAN profile indexing signaling, the cell may transmit a new bitmap.

In another implementation, the cell may use an RRC message, such as ProfileAdd, ProfileDelete, ProfileModify, or ProfileCancel, for various actions to the RAN profile indexing settings.

After the UE receives the change notification of RAN profile indexing, the UE may respond with a confirmation message to acknowledge the support of the RAN profile changes.

The present application provides a RAN profile indexing operation for cell-specific RAN profile indexing. FIG. 9A shows a diagram illustrating a method for RAN profile signaling, according to an exemplary implementation of the present application.

In block 901, a cell transmits (e.g., periodically, aperiodically, or on-demand) to a UE a system information block x (SIBx), containing cell-specific RAN profile indexing information, where all RAN profile indexing in the cell-specific RAN profile is common (e.g., the same) among all UEs served by the cell. The cell may use bitmap form indexing signaling to indicate the associated PHY configuration for the respective index. An exemplary form of SIBx is provided below merely for illustration, SIBx{Index 0:=0 10111 . . . 10;
Index 1:=100111 . . . 11;
. . .
Index 4:=001010 . . . 01}.

In block 903, the cell and the UE perform an RRC connection procedure and establish an RRC connection for subsequent data transmission.

In block 905, while the UE performs the RRC connection establishment, the UE receives the SIBx and records the RAN profile information of the cell for later data transmission and reception with the respective serving cell. The UE may further determine and verify which RAN profile index the UE does not support based on the UE capability. In block 907, the UE transmits a UECapabilityInformation message (e.g., RAN Profile Index 3) to the serving cell reporting one or more indices that the UE does not support.

In block 909, the cell transmits a DCI message to the UE upon PDCCH to indicate the resource block allocation processing for the UE.

In block 911, the cell transmits another SIBx to re-configure the RAN profile indexing. Specifically, when the cell decides to re-configure one specific indexing (e.g., upon receiving the request from UE(s) or the request from the CN or based on the operating requirement of the cell), the cell appends the action field in the RRCConnectionReconfiguration message or paging message to indicate the changes in the SIBx.

For example, when the cell modifies Index 1 from "100111 . . . 111" to "111111 . . . 111", the cell may page the UE and transmit a new SIBx at a predefined time (e.g., after the modification period). The UE may respond to the cell with a confirmation message if the changes to the RAN profile indexing is unsupported by UE or an acknowledge message if the UE is capable of supporting the changes.

Figure 9B:
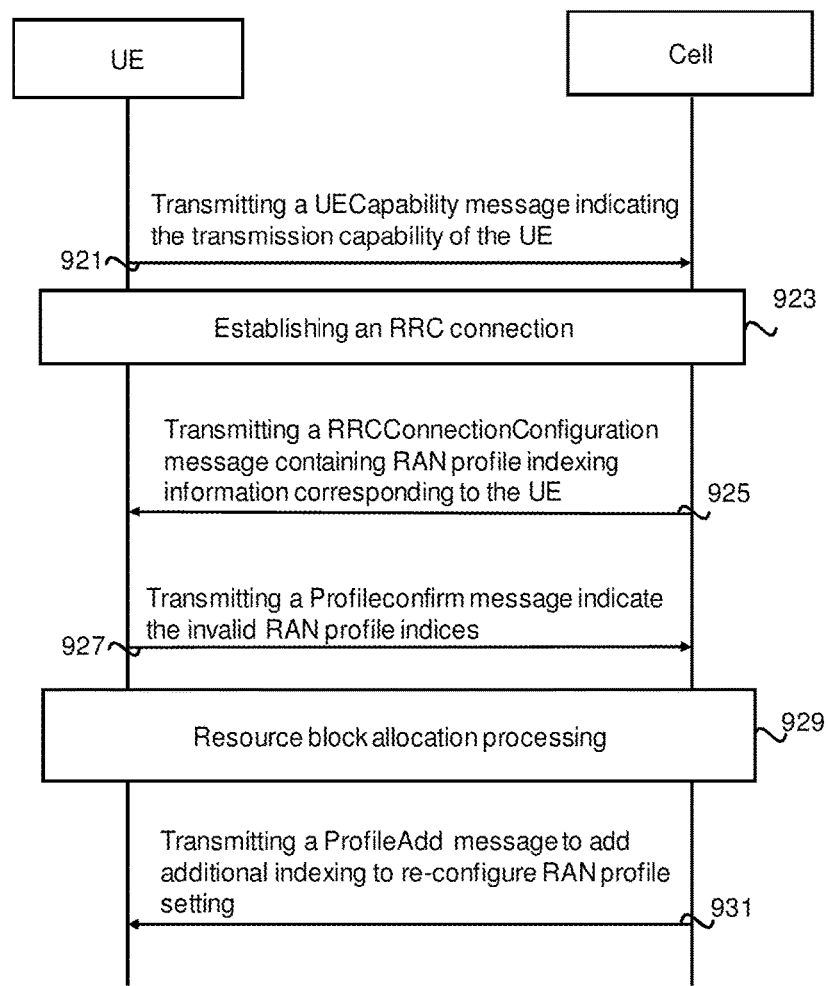
FIG. 9B is a diagram illustrating a method for RAN profile signaling, according to an exemplary implementation of the present application.

The present application provides a RAN profile indexing operation for user-specific RAN profile indexing. FIG. 9B shows a diagram illustrating a method for RAN profile signaling, according to an exemplary implementation of the present application. Since the cell in the present implementation adopts user-specific RAN profile indexing, not RAN profile indexing need to be transmitted in all system information (SI). Instead, a UE will first indicate its capability.

In block 921, a UE transmits a UECapabilityInformation message to a serving cell indicating the capability of the UE.

In block 923, the serving cell and the UE perform an RRC connection procedure and establish an RRC connection for subsequent data transmission.

In block 925, after establishing the RRC connection, the serving cell transmits an RRCConnectionConfiguration message containing RAN profile indexing information element (IE) to the UE to indicate the corresponding RAN profile indexing for the UE based on the UECapabilityInformation message.

An exemplary form of the RRCConnectionConfiguration message may be:
RRCConnectionConfiguration{
Profile Indexing IE;
Index 0:=Spacing #1, Multiplexing #3 . . .
Index 1:=Spacing #4, Multiplexing #1 . . .
. . .
Index 3:=Spacing #2, Multiplexing #1 . . . }

In block 927, the UE transmits a Profileconfirm message after receiving the RRCConnectionConfiguration message to the serving cell to indicate all of the invalid RAN profile indices (e.g., the mapped physical layer configuration setting indicating unsupported by the UE).

In block 929, upon receiving the Profileconfirm message from the UE, the serving cell transmits a DCI message to the UE in a PDCCH to indicate the resource block allocation processing for the UE.

In block 931, the serving cell transmits a ProfileAdd message to add an additional RAN profile indexing newly defined when the cell determines to reconfigure the current RAN profile settings for the respective UE.

An exemplary implementation of the present disclosure provides a non-transitory computer-readable media, for storing a computer executable program for the aforementioned methods for signaling RAN profile indexing (e.g., as depicted by FIGS. 2, 4A, 4B, and 6B), for a UE to communicate with a serving cell (e.g., as depicted by FIG. 6A), for user-specific and cell-specific RAN profile indexing reconfiguration (e.g., as depicted respectively in FIGS. 4C, 9A, and 9B). When the non-transitory computer readable recording medium is read by a processor with communication processing capability, the processor executes the aforementioned RAN profile indexing methods as well as user-specific and cell specific RAN profile indexing methods. The non-transitory computer-readable media may be a floppy disk, a hard disk, a compact disk (CD), a flash drive, a magnetic tape, accessible online storage database or any type of storage media having similar functionality, such as storing program instructions or data, known to those skilled in the art.

Figure 10:
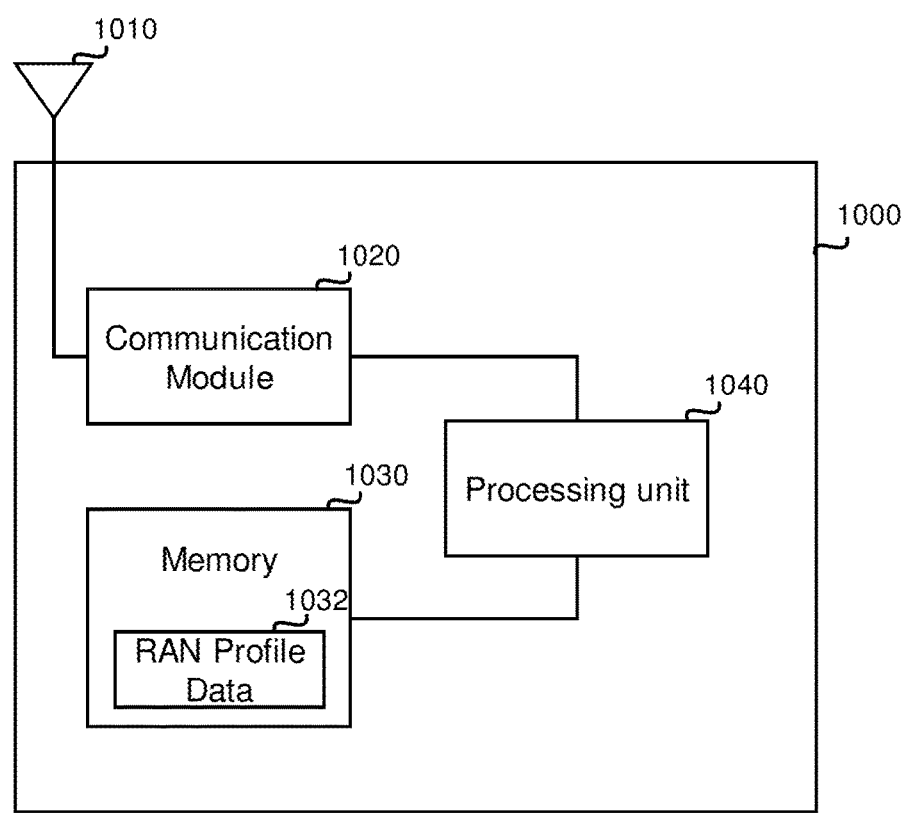
FIG. 10 is a diagram illustrating a radio communication equipment, according to an exemplary implementation of the present application.

FIG. 10 shows a block diagram illustrating a radio communication equipment for a cell, according to an exemplary implementation of the present application. The radio communication equipment may be configured to implement the RAN profile indexing algorithm depicted in FIG. 2. In FIG. 10, radio communication equipment 1000 includes antenna module 1010, communication module 1020, memory 1030, and processing unit 1040. Antenna module 1010 is coupled to communication module 1020. Communication module 1020 and memory 1030 are configured to couple to processing unit 1040.

Antenna module 1010 may comprise one or more antennas, and may be configured to perform beamforming omni-transmission with one or more UEs within its serving cell. Communication module 1020 may comprise one or more transmitters and one or more receivers for allowing the cell to perform data transmission and reception with the UEs within its cell coverage using antenna module 1010.

Processing unit 1040 is configured to control the operation of the cell and function as the central processing core for the cell. Memory 1020 is configured to store program instructions for the execution by processing unit 1040. Memory 1020 is further configured to allocate a memory space for storing RAN profile indexing data and the corresponding physical layer configuration settings. The program instructions stored upon execution by processing unit 1040, causes the processing unit 1040 to implement one or more the aforementioned methods for signaling RAN profile indexing.

In one implementation, radio communication equipment 1000 may further include a timer (not explicitly shown in FIG. 10). The timer is configured for timing a predefined time interval after that radio communication equipment 1000 signals the RAN profile indexing information to the one or more UEs within its radio coverage using broadcast or unicast transmission. During the predefined time interval, radio communication equipment 1000 may not make any updates to its current RAN profile indexing and PHY configurations.

Additionally, radio communication equipment 1000 may further include other necessary network elements for supporting the network operations of the cell may not be essential to the present application. The details of such elements are hereby omitted for brevity.

What is claimed is:

1. A method for signaling physical layer profiles to a user equipment (UE), the method performed by the UE comprising:
receiving, from a serving cell, a physical layer profile message comprising a plurality of sets of physical layer parameters of the cell and a plurality of indices of the cell corresponding to the plurality of sets of physical layer parameters; receiving, from the serving cell, a downlink control information (DCI) message indicating an allocated resource block (RB) in a physical downlink shared channel (PDSCH) for the UE and a radio access network (RAN) profile index corresponding to one of the plurality of sets of physical layer parameters stored at the UE; and
decoding the allocated resource block by using the one of the plurality of sets of physical layer parameters according to the RAN profile index received in the DCI.

2. The method of claim 1, further comprising:
transmitting, to the serving cell, an acknowledge message indicating that the UE supports all of the plurality of indices after receiving the physical layer profile message.

3. The method of claim 1, wherein the physical layer profile message is received via a broadcast system information (SI) message.

4. The method of claim 1, wherein the physical layer profile message is received periodically via a broadcasting channel (BCH).

5. The method of claim 1, wherein the physical layer profile message is received via a unicast radio resource control (RRC) message.

6. A user equipment (UE) comprising:
a communication module coupled to an antenna module, the communication module configured to communicate with a serving cell;
a processor coupled to the communication module; and
a memory coupled to the processor, the memory configured to store instructions that, when executed by the processor, cause the processor to:
receive, from the serving cell via a broadcast message, a physical layer profile message comprising a plurality of sets of physical layer parameters of the cell and a plurality of indices of the cell corresponding to the plurality of sets of physical layer parameters; receive, from the serving cell, a downlink control information (DCI) message indicating an allocated resource block (RB) in a physical downlink shared channel (PDSCH) for the UE and a radio access network (RAN) profile index corresponding to one of the plurality of sets of physical layer parameters stored at the UE; and
decode the allocated resource block by using the one of the plurality of sets of physical layer parameters according to the RAN profile index received in the DCI.

7. The UE of claim 6, wherein the instructions, when executed by the processor, further cause the processor to:
transmit, to the serving cell, an acknowledge message indicating that the UE supports all of the plurality of indices after receiving the physical layer profile message.

8. The UE of claim 6, wherein the physical layer profile message is received via a broadcast system information (SI) message.

9. The UE of claim 6, wherein the physical layer profile message is received via a unicast radio resource control (RRC) message.

10. The UE of claim 6, wherein the instructions, when executed by the processor, further cause the processor to transmit, to the cell, a request for the physical layer profile message.

11. The method of claim 1, wherein at least one of the plurality of sets of physical layer parameters comprises at least one of a subcarrier spacing value, a channel coding mode and cyclic prefix length value, a transmission time interval (TTI) value, and a multiplexing mode.

12. The UE of claim 6, wherein at least one of the plurality of sets of physical layer parameters comprises at least one of a subcarrier spacing value, a channel coding mode and cyclic prefix length value, a transmission time interval (TTI) value, and a multiplexing mode.

13. The UE of claim 6, wherein the physical layer profile message is received periodically via a broadcasting channel (BCH).

14. The method of claim 1, further comprising:
transmitting, to the serving cell, a request for the physical layer profile message.

* * * * *